J. K. EASH.
BROODER.
APPLICATION FILED OCT. 1, 1913.

1,115,417.

Patented Oct. 27, 1914.
2 SHEETS—SHEET 1.

Witnesses:
Christ Feinle Jr.,
K. Peacock

Inventor,
J. K. Eash.
By Victor J. Evans,
Attorney.

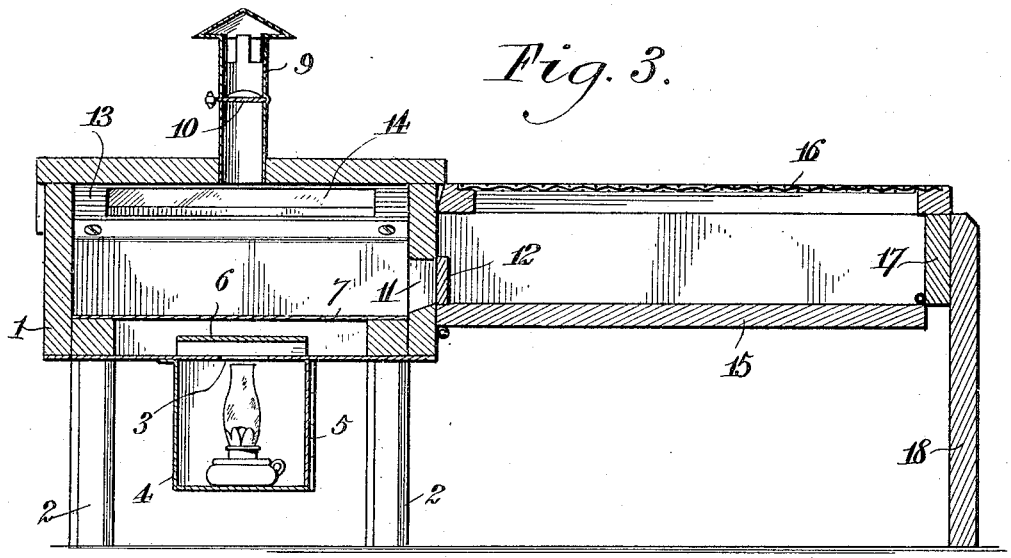
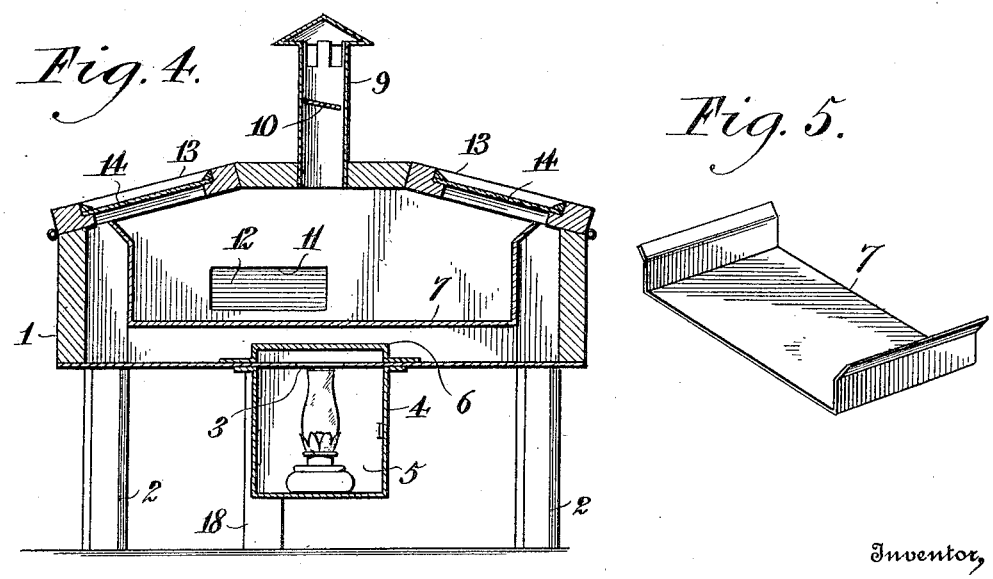

UNITED STATES PATENT OFFICE.

JOHN K. EASH, OF JET, OKLAHOMA.

BROODER.

1,115,417.   Specification of Letters Patent.   Patented Oct. 27, 1914.

Application filed October 1, 1913.   Serial No. 792,839.

*To all whom it may concern:*

Be it known that I, JOHN K. EASH, a citizen of the United States, residing at Jet, in the county of Alfalfa and State of Oklahoma, have invented new and useful Improvements in Brooders, of which the following is a specification.

This invention has relation to brooders and it consists in the novel features hereinafter described and claimed.

An object of the invention is to provide a brooder of simple structure having means for efficiently heating and ventilating the same.

Figure 1:
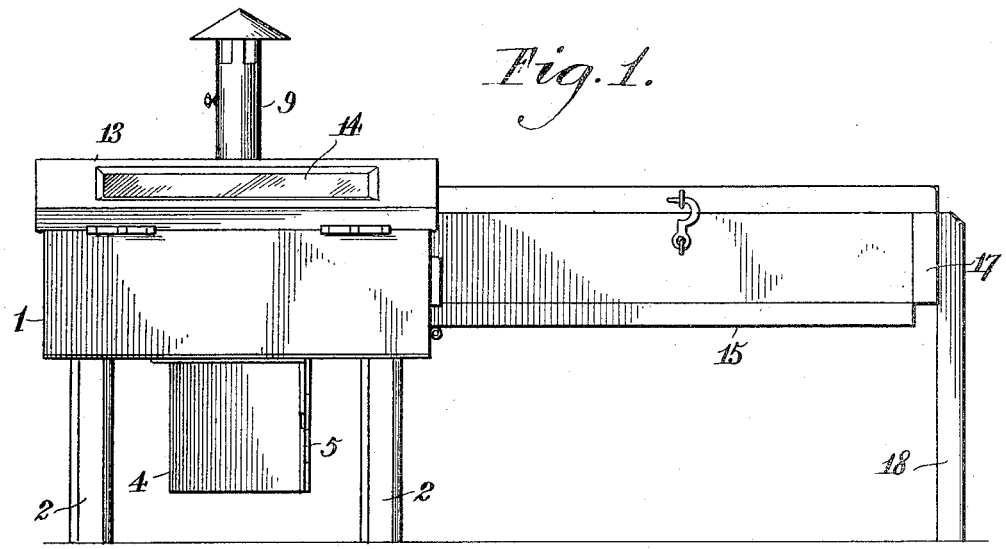
Figure 2:
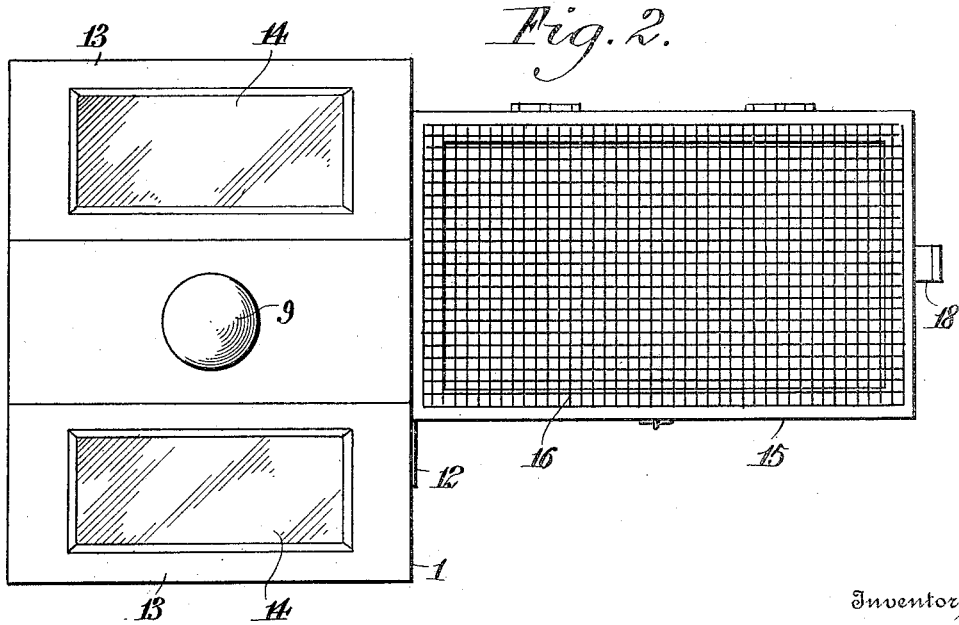

In the accompanying drawings:—Figure 1 is a side elevation of the brooder. Fig. 2 is a top plan view of the same. Fig. 3 is a longitudinal sectional view of the same. Fig. 4 is a transverse sectional view of the same. Fig. 5 is a perspective view of a pan used in the brooder.

The brooder comprises a body 1 which is mounted upon legs 2. The said legs extend up into the corner portions of the body 1. The body 1 is provided in its bottom with an opening 3 below which is located a lamp compartment 4. The compartment 4 is provided with a hinged door 5. A U-shaped partition 6 is positioned upon the bottom of the body 1 over the opening 3 and the intermediate portion of a pan 7 is spaced from the partition 6 and the edge portions of the said pan are secured to side pieces which rest upon the bottom of the body 1. The end portions of the pan 7 are secured to the portions of the legs 2 which are above the bottom of the body 1 and consequently the major portion of the under surface of the pan 7 is spaced from the upper surface of the bottom of the body and the ends of the pan are spaced from the end wall of the body 1. Therefore when a lamp is placed in the compartment 4, the heat may pass up into the body 1 under and around the ends of the pan 7 and up and out of the body 1 through a flue 9 provided within the top of the body. The flue 9 is provided with a damper 10 which may be positioned to control the passage of the heat through the body 1. The pan 7 is preferably formed from sheet metal and is adapted to contain sand and consequently this sand is heated by the passage of the heat around the ends of the pan and under the bottom of the same.

The body 1 is provided at one side with an opening 11 and a slide 12 is mounted upon the exterior of the body 1 and adapted to be moved over the said opening. The top of the body 1 consists partially of hinged doors 13 which are provided with transparencies 14. A box 15 is hinged at one end to that side of the body 1 which is provided with the opening 11 and the said box constitutes the nursery or runway for the chicks. The box 15 is provided with a hinged screen top 16 and at that end of the box 15 opposite the end thereof which is attached to the body 1 is provided a hinged panel 17 having a leg 18 fixed thereto.

When the chicks are young or at other times desired they may be confined in the body 1 by closing the slide 12 over the opening 11. When it is desired to feed the chicks the slide 12 may be opened whereby they can pass through the opening 11 into the box 15. The screened top 16 will prevent small animals as for instance rats or mice from entering the box and the brooder through the opening 11. When it is desired to use the box 15 as a runway for the chicks the panel 17 is swung to an open position and the said panel and the attached leg are laid flat on the floor or ground whereby the box 15 is disposed in an inclined position from the opening 11 to the floor or ground. Therefore the chicks may pass readily in and out of the brooder through the said runway or box 15.

Having described the invention what is claimed is:—

A brooder comprising a body provided at its bottom with an opening, hinged doors attached to the top of the body, a flue mounted at the top of the body between the doors, a lamp compartment located at the bottom of the body below the opening therein, a partition located in the body over said opening, and a pan supported in the body in spaced relation to the bottom thereof and said partition, said pan having edges which extend to two sides of the body, and another set of edges which are spaced from the other sides of the body and spaced from the doors.

In testimony whereof I affix my signature in presence of two witnesses.

JOHN K. EASH.

Witnesses:
  JOHN DYODER,
  F. P. CARY.

Copies of this patent may be obtained for five cents each, by addressing the "Commissioner of Patents, Washington, D. C."